US011231042B2

United States Patent
Werdecker et al.

(10) Patent No.: US 11,231,042 B2
(45) Date of Patent: Jan. 25, 2022

(54) MECHANICAL SEAL ASSEMBLY WITH SAFETY SEAL (71) Applicant: EagleBurgmann Germany GmbH & Co. KG, Wolfratshausen (DE)

(72) Inventors: Ferdinand Werdecker, Walchensee (DE); Florian Bauer, Oberfischbach (DE); Stephan Rankl, Gilching (DE); Benjamin Hellmig, Munich (DE); Klaus Kneissl, Dietramszell (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 228 days.

(21) Appl. No.: 16/483,663

(22) PCT Filed: Jan. 16, 2018

(86) PCT No.: PCT/EP2018/050919
§ 371 (c)(1),
(2) Date: Aug. 5, 2019

(87) PCT Pub. No.: WO2018/145861
PCT Pub. Date: Aug. 16, 2018

(65) Prior Publication Data
US 2020/0032809 A1 Jan. 30, 2020

(30) Foreign Application Priority Data
Feb. 9, 2017 (DE) .......................... 102017202038.5

(51) Int. Cl.
*F16J 15/38* (2006.01)
*F04D 29/08* (2006.01)
(Continued)

(52) U.S. Cl.
CPC .............. *F04D 29/08* (2013.01); *F01D 11/00* (2013.01); *F16J 15/3484* (2013.01)

(58) Field of Classification Search
CPC ...... F16J 15/34; F16J 15/3464; F16J 15/3484; F01D 11/00; F04D 29/08
See application file for complete search history.

(56) References Cited

U.S. PATENT DOCUMENTS 4,754,981 A * 7/1988 Burns .................... F16J 15/348
277/353
5,336,047 A * 8/1994 Kolhouse .............. F04D 29/126
277/353
(Continued)

FOREIGN PATENT DOCUMENTS

DE      4225642 C1     7/1993
DE      29818576 U1    3/2000
(Continued)

OTHER PUBLICATIONS

International Search Report issued in PCT/EP2018/050919, dated Mar. 27, 2018.

*Primary Examiner* — Gilbert Y Lee
(74) *Attorney, Agent, or Firm* — Locke Lord LLP; Scott D. Wofsy (57) ABSTRACT

The invention relates to a mechanical seal assembly comprising a mechanical seal (2) comprising a rotating mechanical seal (20) and a stationary mechanical seal (21) defining a sealing gap (22) therebetween, and a one-piece safety seal (3) provided as a redundant seal in the event of failure of the mechanical seal (2) and adapted to seal at a rotating component, the safety seal (3) comprising a base body (30) and a sealing area (31) projecting from the base body (30) in the axial direction (X-X) and being flexible, a thickness of the sealing area (31) in the radial direction being smaller than a thickness of the base body (30) in the radial direction, and the safety seal (3) being arranged in a stationary manner and comprising a sealing surface (32) on an inner circumference.

14 Claims, 7 Drawing Sheets (51) Int. Cl.
    *F01D 11/00*     (2006.01)
    *F16J 15/34*     (2006.01)

(56) References Cited

U.S. PATENT DOCUMENTS

| | | |
|---|---|---|
| 5,412,977 A | 5/1995 | Schmohl et al. |
| 7,823,885 B2 | 11/2010 | Droscher et al. |
| 8,764,018 B2 * | 7/2014 | Schwerdtfeger ....... F16J 15/002 277/394 |

FOREIGN PATENT DOCUMENTS

| | | |
|---|---|---|
| DE | 202008003418 U1 | 5/2008 |
| EP | 2816262 A1 | 12/2014 |
| JP | S52-046251 A | 4/1977 |
| JP | S60-027700 A | 2/1985 |
| JP | H01-166861 U | 11/1989 |
| JP | 2011-058644 A | 3/2011 |
| WO | 2013/121812 A1 | 8/2013 |

\* cited by examiner

MECHANICAL SEAL ASSEMBLY WITH SAFETY SEAL

CROSS REFERENCE TO RELATED APPLICATIONS

This application is a U.S. National Phase Application filed under 35 U.S.C. § 371, based on International PCT Patent Application No. PCT/EP2018/050919, filed Jan. 16, 2018, which application claims priority to German Patent Application No. 102017202038.5 filed on Feb. 9, 2017. The entire contents of these applications is incorporated herein by reference in their entirety.

This invention relates to a mechanical seal assembly comprising a mechanical seal and a safety seal as a redundant seal for the mechanical seal, wherein the safety seal is not formed as a mechanical seal.

Mechanical seals are known in various designs from prior art. A wide variety of sealing tasks may be solved using mechanical seals, especially toxic media or media having very high pressures and/or very high temperatures may be sealed. Especially safety means should be provided for environmental protection in hazardous applications. It is known, for example, to arrange two mechanical seals in series between a product side and an atmosphere side. If the first mechanical seal fails, the second mechanical seal serves as a safety seal preventing the product from escaping into the environment. The second mechanical seal may be the same as the first mechanical seal or may be different. This approach to protection is very safe, but still suffering from high costs, as mechanical seals are very expensive to manufacture.

Therefore, it is the object of the present invention to provide a mechanical seal assembly comprising a mechanical seal providing protection in the event of damage to the mechanical seal to prevent the environment from being contaminated by the medium to be sealed, wherein the safety seal is not a mechanical seal. This object will be solved by a mechanical seal assembly having the characteristics of claim 1, the subclaims showing preferred embodiments of the invention.

Contrary to this, the mechanical seal assembly according to the invention having the features of claim 1 has the advantage that a mechanical seal assembly may be provided which allows for a low-cost safety seal to secure a mechanical seal. There is no need for a second mechanical seal to be used as a safety seal, but the safety seal is a one-piece seal which is provided as a redundant seal in the event of failure of the mechanical seal.

The safety seal comprises a main body and a sealing area integral with the main body, extending away from the main body in the axial direction. The sealing area is formed to be flexible. Furthermore, the safety seal, at an inner circumference, has a sealing surface which is intended for sealing contact with a rotating component. Herein, the safety seal is stationary. Thus, a relatively inexpensive one-piece safety seal may be employed to secure the mechanical seal without the need for a second mechanical seal as a safety seal. Thus, in the event of failure of the mechanical seal, e.g. damage or the like, the safety seal may provide a seal against the atmosphere at the rotating component. Sealing may be generated very fast, wherein especially any overpressure of the medium to be sealed provides a supporting effect. Furthermore, the safety seal ensures that during normal operation no excessive additional friction occurs between the rotating and stationary components of a system. This minimizes additional losses due to the safety seal during normal operation.

It is preferred for a thickness of the sealing area to be smaller in radial direction than a thickness of the base body in radial direction.

Preferably the base body and the sealing area of the safety seal are integrally produced using same material. In this way, especially the production costs may be kept very low. It is especially preferred for the material of the safety ring to be fiber-reinforced. It is furthermore preferred for the base material for the safety seal to be a thermoplastic polymer, preferably fiber-reinforced.

According to another preferred embodiment of the present invention, a transition towards an outside of the safety seal between the base body and the narrow sealing area is configured as an arc. An arc-shaped transition ensures the transition to be edge-free, so that the risk of cracks that are likely to occur in an edge-shaped transition will be minimized.

It is furthermore preferred for the narrow sealing area to project from the base body towards the mechanical seal from the base body. This allows for a particularly compact design of the mechanical seal assembly to be realized.

According to another preferred embodiment of the present invention, the sealing area of the safety seal comprises a surface devoid of projecting portions, such as lips or the like.

According to an alternative embodiment of the invention, a plurality of lips are arranged at the sealing area of the safety seal, extending in the circumferential direction and projecting from the sealing surface. The lips preferably project radially from the sealing surface. The lips contact a rotating component, such as particularly preferably a shaft or a shaft sleeve or the like. During normal operation, this contact ensures that there is as little friction as possible on the safety seal in order to keep losses due to the use of the safety seal as low as possible. In the event of damage to the mechanical seal, when the level of medium to be sealed reaches the safety seal, a pressure acting on the axially projecting sealing area of the safety seal increases so that the lips, which are made of the same material as the rest of the safety seal and are integrally provided on the sealing area and are provided integrally on the sealing area, will be bent such that reasonable sealing is possible between the safety seal and the rotating component. The lips projecting from the sealing surface are preferably of the same length in the radial direction and in addition are preferably circumferentially closed.

Preferably, the lips are only arranged at the sealing area of the safety seal. Alternatively, the lips are provided both at the sealing area and partially or completely at the base body. However, by exclusively providing them at the sealing area, it is possible that in the event of failure of the mechanical seal, the flexibly deforming lips may come into close contact with the outer circumference of the rotating component and, as no lips are provided on the base body, excessive friction and thus excessive heat generation may thus be avoided.

Moreover, a cylindrical outer circumference of the sealing area in the axial direction is preferred. This allows for particularly cost-effective manufacturability.

According to an alternative embodiment of the invention, an outer circumference of the sealing area in axial direction is provided as being tapered towards a free end of the sealing area. This allows for a sealing area to be provided which is of increasingly greater rigidity due to the increasing outside diameter, starting from the free end of the sealing area in the direction of the base body.

The tapered outer circumference of the sealing area is preferably provided in axial direction along the entire sealing area.

According to another preferred embodiment of the invention, the sealing area has a lip-free projection that starts from a first lip, which is located most proximal to a free end of the sealing area. The lip-free projection is pressure-relieved as the pressure on one outer circumference and one inner circumference as well as on the end face of the free end is the same.

Preferably, a length L3 of the lip-free projection in the axial direction is approximately one third of a length L2 of the sealing area in the axial direction. This allows for realization of secure stiffening of the sealing area.

It is furthermore preferred for the mechanical seal assembly to comprise a rotating component which is connected to the rotating slide ring of the mechanical seal. In the rotating component, recesses are provided which are radially arranged within the sealing area. In other words, recesses exist at the rotating component in the area of the safety seal. Although this increases leakage through the safety seal from an interstice between the safety seal and the mechanical seal into the atmosphere, the recesses in the rotating component have the advantage that in the event of failure, i.e. failure of the mechanical seal, improved heat dissipation is possible via the now sealing safety seal, which fits closer to the rotating component. This avoids thermal damage to the safety seal, so that the service life of the safety seal may significantly be increased. This ensures that the safety seal seals until the rotating component comes to a standstill and prevents medium from escaping into the atmosphere through the safety seal. The inevitable leakage is accepted for safety reasons.

The recesses in the rotating component are preferably grooves or slots running in the axial direction. A cross-section of the grooves is preferably rectangular or V-shaped.

In order to allow sufficient cooling in the event of damage, the length of the grooves in the axial direction is greater than the length of the sealing area of the safety seal and especially is greater than the length in the axial direction of the lipped sealing surface of the safety seal.

The mechanical seal assembly is particularly preferred to include exactly one mechanical seal and exactly one safety seal. This makes it possible to provide a particularly compact and cost-effective mechanical seal assembly, particularly in the axial direction.

Moreover, the present invention relates to a working machine, in particular a pump or a compressor or an expander.

In the following, preferred example embodiments of the invention will be described in detail while reference is made to the accompanying drawing, wherein.

Below, a mechanical seal assembly 1 is described in detail according to a first preferred example embodiment of the invention, while reference is made to FIGS. 1 to 4.

Figure 1:
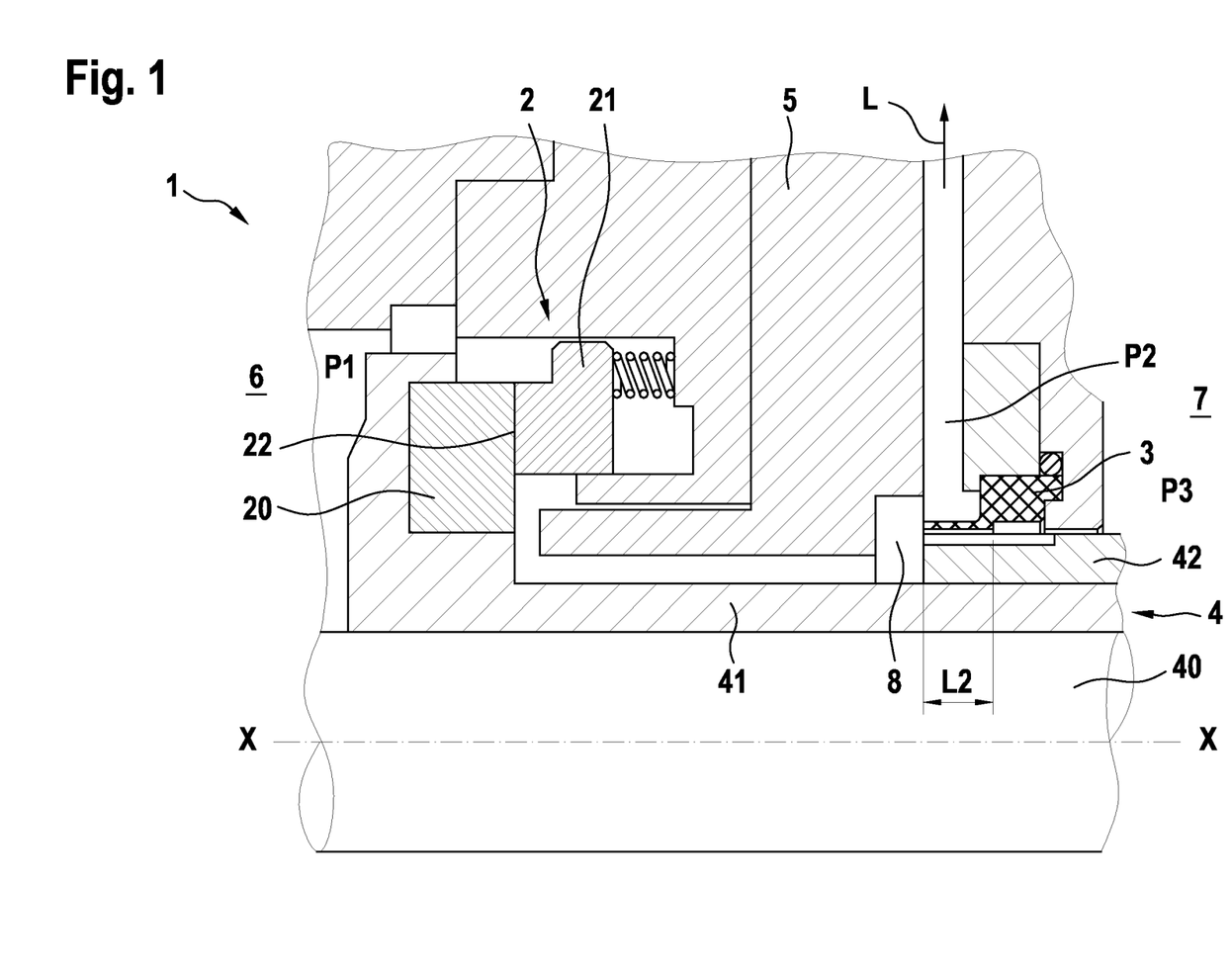
FIG. 1 is a schematic cross-sectional view of a mechanical seal assembly according to a first example embodiment of the invention.

As may be seen from FIG. 1, the mechanical seal assembly 1 comprises exactly one mechanical seal 2 comprising a rotating slide ring 20 and a stationary slide ring 21, delimiting a sealing gap 22 therebetween.

Furthermore, a rotating component 4 is provided, which, in this example embodiment, comprises a shaft 40, a first sleeve 41 and a second sleeve 42. A multi-part housing is identified using reference number 5.

The mechanical seal assembly 1 seals a product side 6 from an atmosphere side 7. On the product side 6 a product pressure P1 is applied, which is many times higher than a pressure P3 on the atmosphere side. Between the mechanical seal 2 and a safety seal 3, an interstice 8 is also provided in which a pressure P2 prevails. The pressure P2 approximately corresponds to the pressure P3 on the atmosphere side 7. Leakage, which occurs via the sealing gap 22 during normal operation of the mechanical seal assembly, is discharged via the interstice 8, as indicated by the arrow L. During normal operation of the mechanical seal assembly, the leakage is discharged via the sealing gap 22.

As can be seen from FIG. 1, the second sleeve 42 is radially arranged within the safety seal 3. The second sleeve 42 is shown in detail in FIG. 4. As can be seen from FIG. 4, the second sleeve 42 comprises a plurality of grooves 9, extending in a straight line in the axial direction X-X. The second sleeve 42 comprises a plurality of grooves 9. The grooves 9 are evenly arranged along the circumference of the second sleeve 42. All grooves 9 have the same geometrical shape, especially having a square cross-section and the same axial length.

As can be seen from FIG. 1, the grooves 9 are radially arranged within the safety seal 3 when the mechanical seal assembly is in the mounted state. A length of the grooves 9 in axial direction X-X is greater than a length L2 of the sealing area of the safety seal 3 in axial direction.

Figure 2:
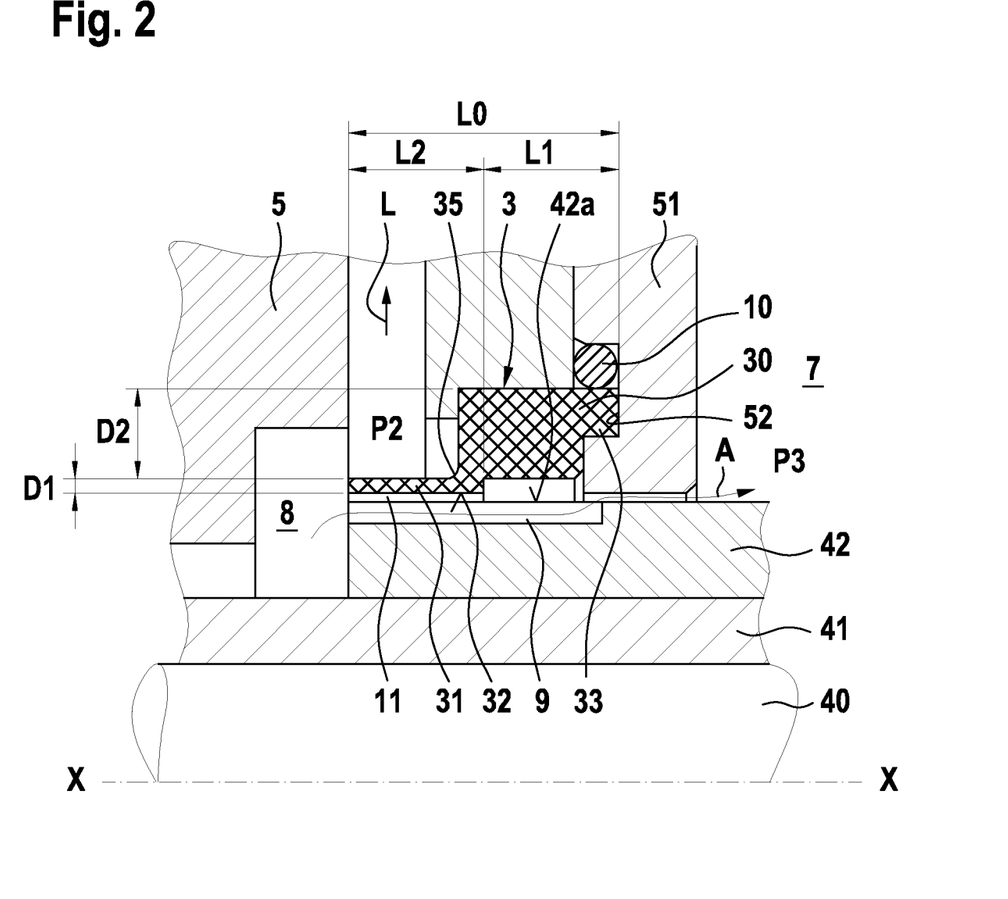
FIG. 2 is an enlarged detail representation of a safety seal of FIG. 1 in the normal state, in which the mechanical seal is not damaged.

The safety seal 3 can be seen in detail in FIG. 2. The safety seal 3 comprises a base body 30 and a narrow sealing area 31 extending from the base body in the axial direction X-X. A sealing surface 32 is provided on the radially inner circumference of the safety seal 3. In this example embodiment, the sealing surface is a cylindrical surface. The sealing surface 32 is completely formed at the sealing area 31 and is formed in part at the base body 30. The base body 30 additionally comprises a shoulder 33 which is formed in a recess 52 in a housing component 51. Furthermore, as may be seen from FIG. 2, an O-ring 10 is provided on the outer circumference of the base body 30 of the safety seal 3 to provide a seal at the radially outer circumference of the safety seal 3.

A thickness D1 of the sealing area 31 is smaller than a thickness D2 of the base body 30 (see FIG. 2).

Thus, the safety seal 3 is integrally formed by the base body 30 and the thinner sealing area 31. Preferably, the material for the safety seal 3 is a fiber-reinforced thermoplastic. As can be collectively seen from FIGS. 1 and 2, the sealing area 31 extends in axial direction towards the mechanical seal 2. A length L2 of the sealing area 31 in the axial direction X-X is the same as a length L1 of the base body 30 in the axial direction X-X. The narrow sealing area 31, which has a significantly smaller thickness in the radial direction than the base body 30, thus increases the flexibility of the sealing area 31, particularly in the radial direction. The safety seal 3 is stationary connected to the housing component 51 and therefore does not rotate with the first and second rotating sleeves 41, 42.

As can be seen from FIG. 2, an arc-shaped transition 35 is provided between the sealing area 31 and the base body 30. Cracks in the safety seal 3 at the transition between the base body 30 and the sealing area 31 will thereby be prevented from occurring, which could result in destruction of the safety seal 3. In the normal state, i.e. when the mechanical seal 2 operates without problems, a gap 11 is formed between an outer circumference 42a of the second sleeve and the sealing surface 32 (FIG. 2). The gap 11 has a radial dimension which is very small. Thus, there is a connection between the intermediate area 8 and the atmosphere 7 through the small gap 11 as well as the grooves 9, which are radially arranged within the safety seal 3. As a pressure difference between pressure P2 in the intermediate range 8 and pressure P3 on the atmosphere side 7 is very small during normal operation, only very small leakage across the gap 11 and grooves 9 occurs. This leakage is indicated by arrow A in FIG. 2. It should be noted that for better clarification the groove 9 is drawn very large in the figures. During normal operation, only minimal leakage (arrow A) across the safety seal 3 occurs due to the small pressure difference of only a few Pascal.

Figure 3:
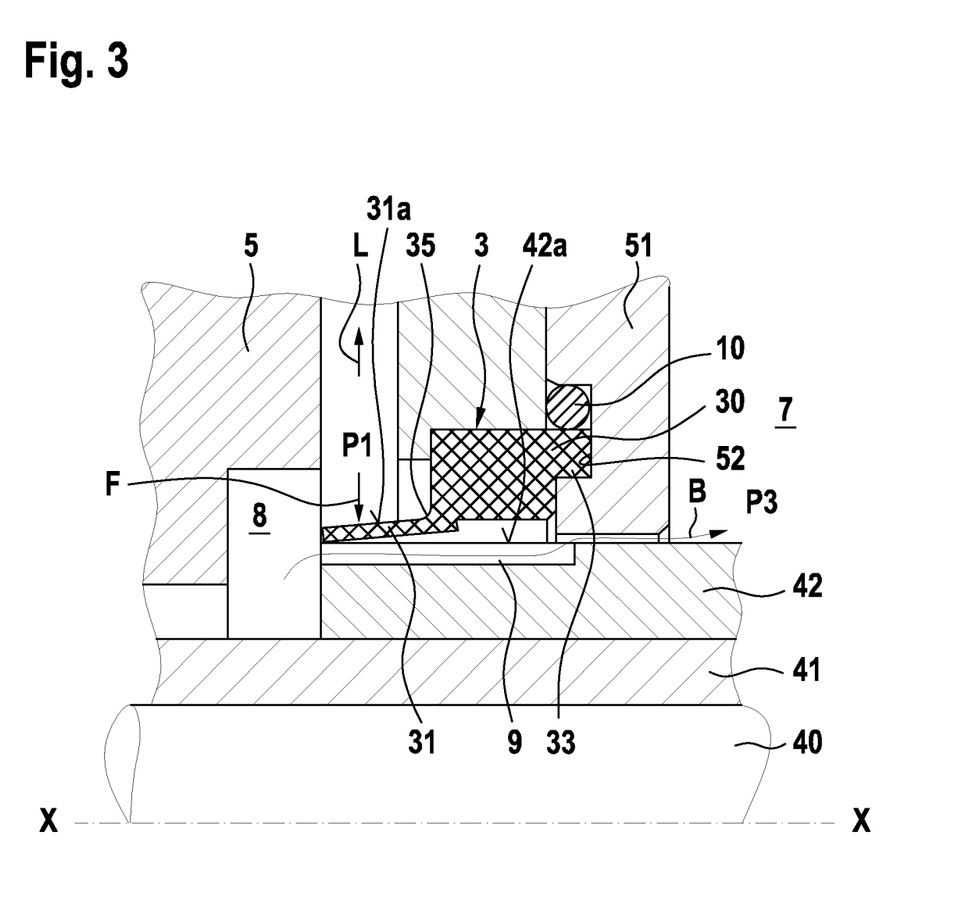
FIG. 3 is a schematic cross-sectional view of the safety seal of FIG. 1 in the event of the mechanical seal being damaged.
Figure 4:
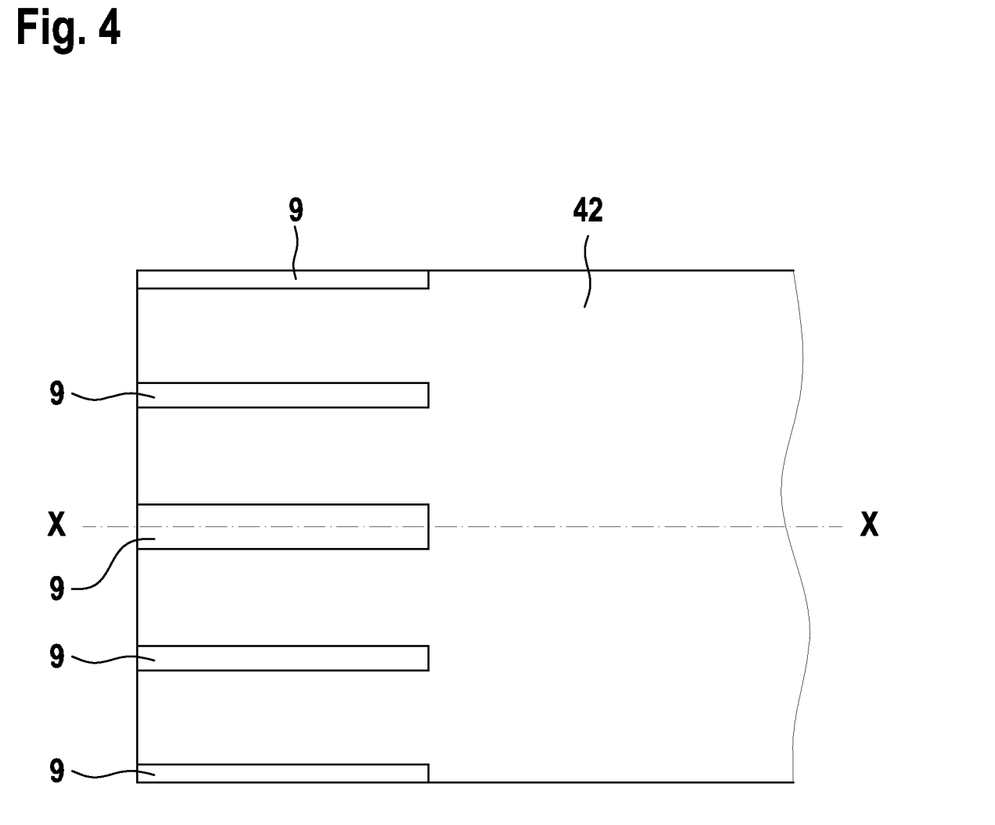
FIG. 4 is a schematic top view of a rotating component with grooves, which is radially arranged within the safety seal.

In the event of failure, when the mechanical seal 2 no longer seals, the safety seal 3 will automatically be activated. This state is illustrated in FIG. 3. Due to the lack of sealing by the mechanical seal 2, the product pressure P1 from the product side prevails in the intermediate area 8. Due to the high pressure, elastic deformation of the sealing area 31 occurs in the intermediate area 8. The product pressure P1 acts on the outer circumference 31a of the sealing area 31, such that elastic deformation of the sealing area 31 occurs and the sealing area 31 is pressed against the outer circumference 42a of the second sleeve 42. The product pressure P1 acts on the outer circumference 31a of the sealing area 31 so that elastic deformation of the sealing area occurs and the sealing area 31 is pressed against the outer circumference 42a of the second sleeve 42. This results in a seal on the outer circumference 42a of the second sleeve 42. Thus, sealing is generated at the outer circumference 42a of the second sleeve, wherein a force F is acting on the outer circumference 31a.

In order to avoid excessive temperature increase of the safety seal 3 in the event of failure, some product medium may also flow through the grooves 9 to the atmosphere side 7 in the event of failure. This is indicated by a leakage (arrow B) in FIG. 3. This, however, provides cooling of the safety seal 3, so that the safety seal 3 can seal at least until the shaft 40 and the other rotating components connected to the shaft will be stopped.

Thus, in case of failure of the mechanical seal 2, the safety seal 3 may automatically be activated. By providing the grooves 9, excessively rapid failure of the safety seal 3 can be prevented by achieving some cooling of the safety seal 3, especially in the region of the sealing area 31, via a flow through the grooves 9 to the atmosphere side 7. Although this, on the one hand, allows some product medium to escape through the grooves 9 to the atmosphere side 7, it can prevent thermal damage to the safety seal 3 and strong outflow of the product medium to the atmosphere side, on the other hand.

It should be noted that in normal applications a pressure difference between the product pressure P1 and the pressure P3 on the atmosphere side 7 is approximately 200 to $300 \times 10^5$ Pa. Even with such a high pressure difference existing between the product side 6 and the atmosphere side 7, the simply and inexpensively constructed safety seal 3 can provide a seal in the event of damage to the mechanical seal 2. Thus, redundant provision of a second mechanical seal for the mechanical seal assembly may be omitted. In addition to cost savings, this also results in savings of axial installation space, as the safety seal 3 in axial direction X-X is only constructed to be very short.

Figure 5:
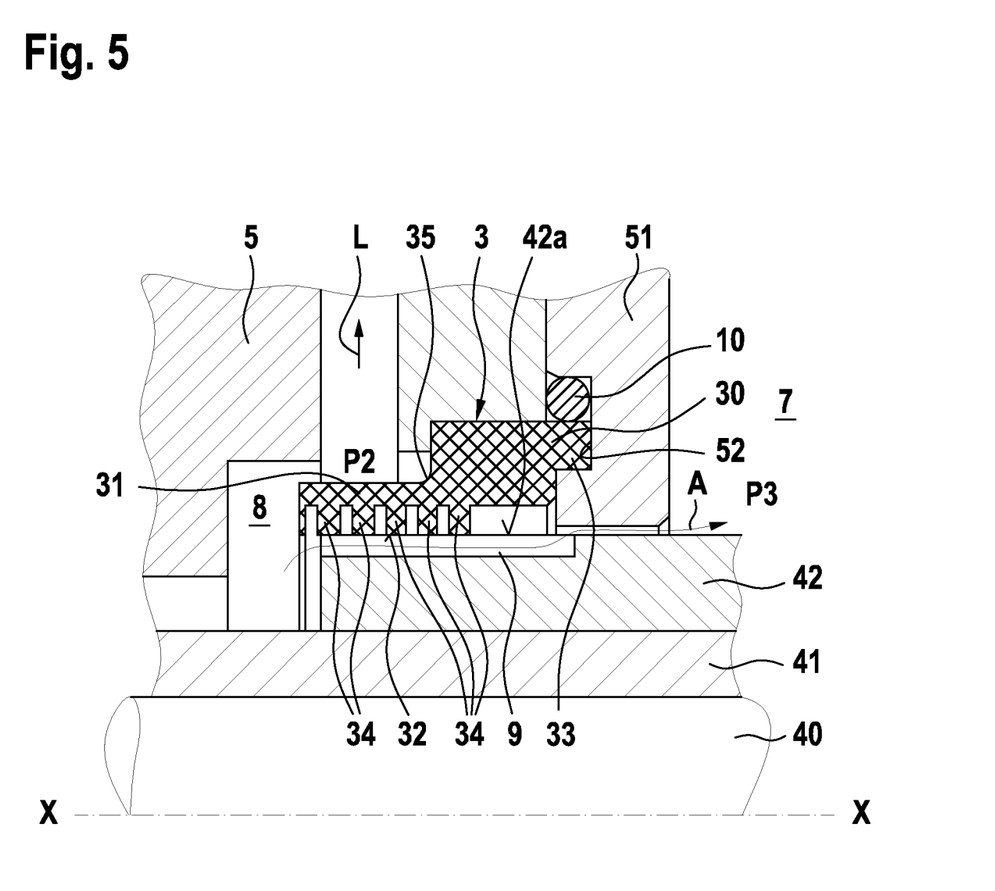
FIG. 5 is an enlarged, schematic cross-sectional view of a mechanical seal assembly comprising a safety seal according to a second example embodiment of the invention.

FIG. 5 shows a mechanical seal assembly 1 according to a second example embodiment of the invention during normal operation. The second example embodiment essentially corresponds to the first example embodiment, wherein, contrary to the first example embodiment, a plurality of lips 34 are formed at the sealing surface 32 in the second example embodiment. In this example embodiment, five lips 34 are provided. The lips 34 extend in the closed state in circumferential direction, thereby contacting the outer circumference 42a of the second sleeve 42. This means that no gap exists between the safety seal 3 and the second sleeve 42, as in the first example embodiment. Since the lips 34 touch the outer circumference 42a of the second sleeve 42, some friction and thus a certain power loss exists during normal operation. However, as the lips are flexible, this power loss may be neglected. In the event of failure, when the mechanical seal 2 is damaged, the pressure P1 on the product side in turn is present on the outer circumference 31a of seal area 31, as it is in the first example embodiment. This causes the lips 34 to deform so that a tight fit of the sealing area 31 at the outer circumference 42a of the second sleeve, and thus sealing, will be enabled by means of the safety seal 3 on the second sleeve 42. The grooves 9 in the second sleeve 42 may also be used to cool the sealing area 31 of the safety seal 3 during failure.

Figure 6:
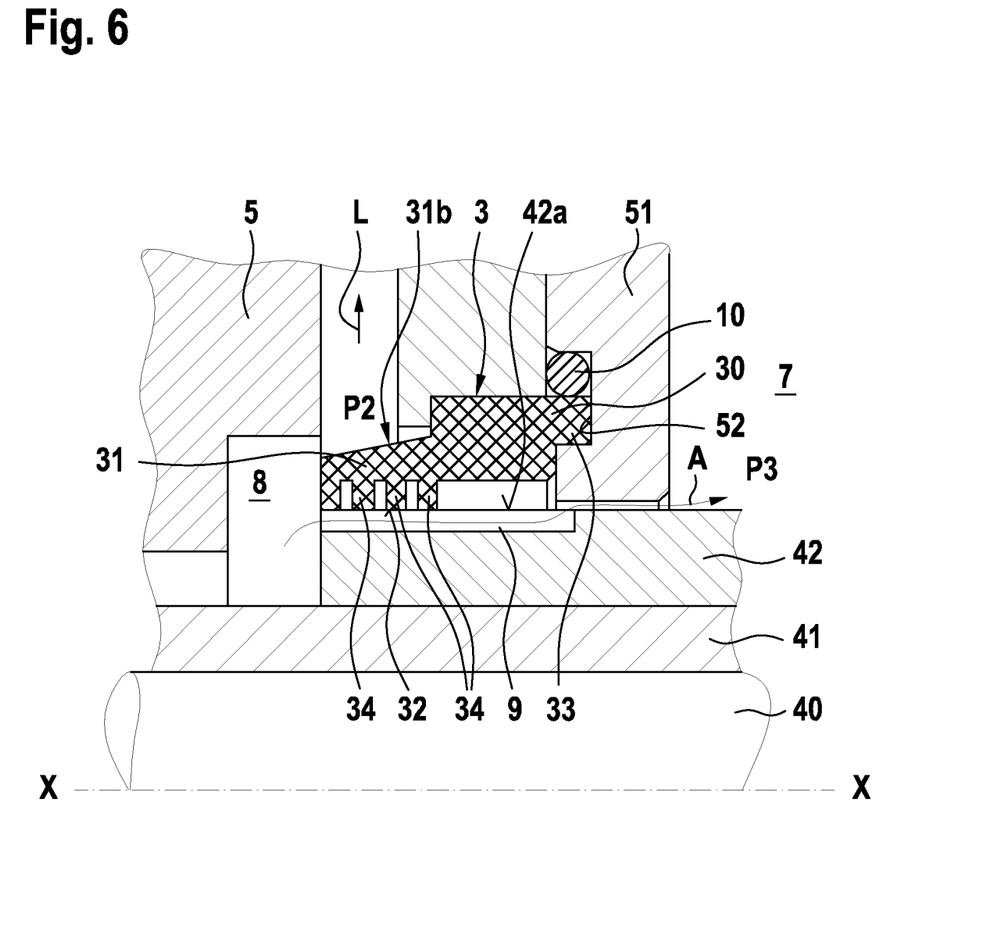
FIG. 6 is an enlarged, schematic cross-sectional view of a mechanical seal assembly comprising a safety seal according to a third example embodiment of the invention.

FIG. 6 shows a mechanical seal assembly 1 comprising a safety seal 3 according to a third example embodiment of the invention in normal operation. The third example embodiment essentially corresponds to the second example embodiment, wherein, contrary to the second example embodiment, in the third example embodiment an outer circumference of the sealing area 31 of the safety seal 3 is provided as the tapered area 31b. Due to the tapered area 31b, in the event of failure, when the mechanical seal 2 is damaged, the pressure applied to the outer circumference of the tapered area 31b of the sealing area 31 may act onto the tapered area 31b with a radial and an axial component, such that an optimized distribution of forces on the sealing area 31 on the outer circumference 42a of the second sleeve 42 is ensured. As in the second example embodiment, in the third example embodiment the lips 34 will as well be deformed in the event of failure allowing the sealing area 31 to closely fit to the second sleeve 42.

Figure 7:
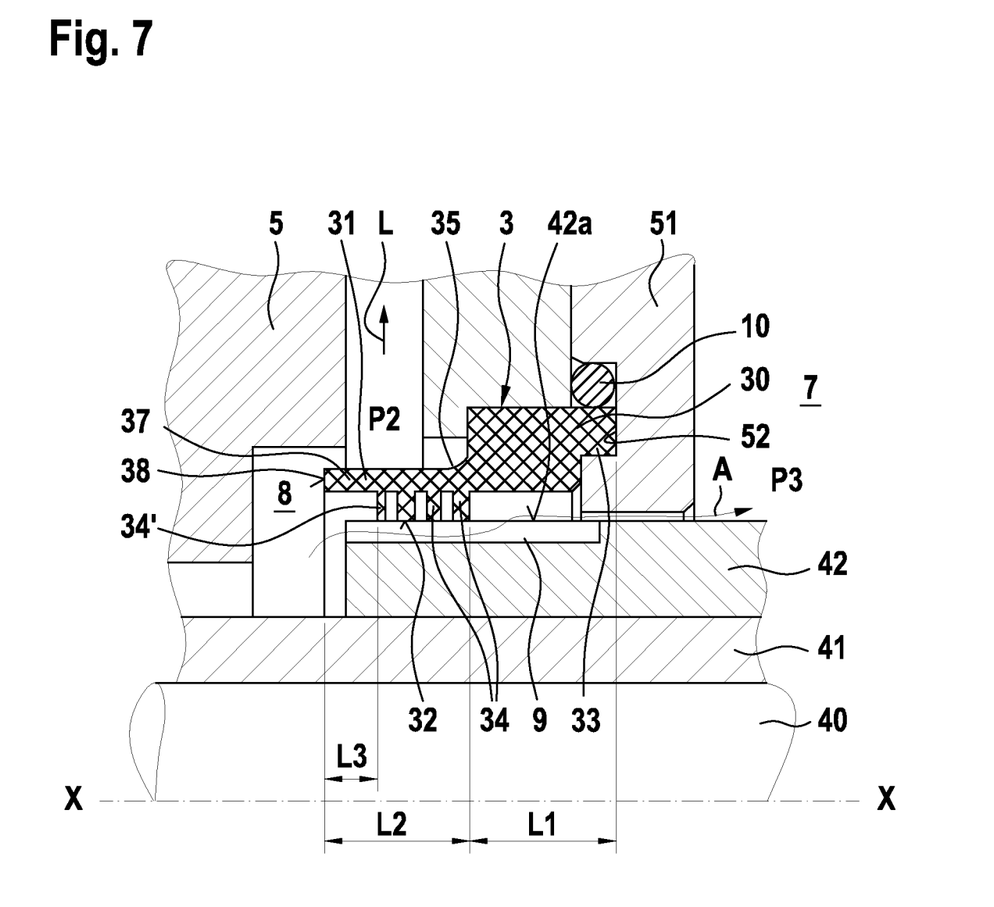
FIG. 7 is an enlarged, schematic cross-sectional view of a mechanical seal assembly comprising a safety seal according to a fourth example embodiment of the invention.

FIG. 7 shows a mechanical seal assembly according to a fourth example embodiment of the invention during normal operation. The mechanical seal of the fourth example embodiment essentially corresponds to that of the second example embodiment, wherein, contrary to the second example embodiment, the sealing area 31 of the fourth example embodiment comprises a lip-free projection 37. The lip-free projection 37 projects in axial direction from a proximal lip 34', which is most proximal to a free end 38 of the sealing area 31, in axial direction. A length L3 of the lip-free projection 37 is approximately ⅓ of a second length L2 of the sealing area 31 in axial direction. A length L1 of the base body 30 in axial direction X-X is approximately equal to the second length L2 of the sealing area 31. The provision of the lip-free projection 37 results in a pressure balanced area at the free end 38 of the sealing area 31. The pressure can be applied to the sealing area 31 on three sides of the lip-free projection 37. This results in stiffening of the sealing area 31. In the event of failure, when the mechanical seal 2 is damaged and the product pressure P1 is applied to the safety seal 3, the sealing area 31 of the safety seal 3 is thus fitted more quickly to the second sleeve 42. The lip-free projection 37 supports contact between the lips 34 and the outer circumference 42a of the second sleeve 42 in the normal state.

It should be noted that, for all the example embodiments described, the grooves 9 are optional. This means that if the rotating component 4 can be stopped in a short period of time, the grooves 9 are not absolutely necessary, as the material of the safety seal 3 can then absorb the heat produced, without destroying the safety seal 3.

It should also be noted that the sealing surface 32 may exclusively be formed in the axial direction on sealing area 31 or, alternatively, may be formed across the entire length of the safety seal 3 in the axial direction, i.e. across the base body and the sealing area 31.

LIST OF REFERENCE NUMBERS 1 mechanical seal assembly
2 mechanical seal
3 safety seal
4 rotating component
5 housing
6 product side
7 atmosphere side
8 intermediate area
9 groove
10 O-ring
11 gap
20 rotating slide ring
21 stationary slide ring
22 sealing gap
30 base body
31 sealing area
31a outer circumference of the sealing area
31b tapered area at the outer circumference of the sealing area
32 sealing surface
33 shoulder
34 lip
35 arc-shaped transition
37 lip-free projection
38 free end of the sealing area
40 shaft
41 first sleeve
42 second sleeve
42a outer circumference of the second sleeve
51 housing component
52 recess
D1 thickness of the sealing area
D2 thickness of the base body
F force to deform the sealing area, i.e. across the base body and the sealing area 31
Arrow A leakage across the safety during normal operational state seal
Arrow B leakage in case of failure
Arrow L leakage during normal operational state
L0 axial overall length of the safety seal
L1 axial length of the base body
L2 axial length of the sealing area
L3 axial length of the lip-free projection
P1 product pressure
P2 pressure in intermediate area
P3 atmosphere pressure

The invention claimed is:

1. A mechanical seal assembly comprising
a mechanical seal including a rotating slide ring and a stationary slide ring defining a sealing gap therebetween, and
a one-piece safety seal provided as a redundant seal in the event of failure of the mechanical seal and arranged to seal on a rotating component,
the safety seal having a base body and a sealing area projecting from the base body in the axial direction and being flexible,
wherein the safety seal is stationary and comprises a sealing surface on an inner circumference; and
a rotating component to which the rotating slide ring is connected, wherein recesses are provide in the rotating component, which recesses are radially arranged inside the safety seal.

2. The mechanical seal assembly according to claim 1, wherein a thickness of the sealing area in the radial direction is smaller than a thickness of the base body in the radial direction.

3. The mechanical seal assembly according to claim 1, wherein the base body and the sealing area are integrally formed of the same material.

4. The mechanical seal assembly according to claim 1, wherein an arc-shaped transition is formed between the base body and the sealing area on an outer circumference.

5. The mechanical seal assembly according to claim 1, wherein the sealing area projects in the axial direction from the base body in the direction of the mechanical seal.

6. The mechanical seal assembly according to claim 1, wherein the sealing surface at the inner circumference of the sealing area is cylindrical.

7. The mechanical seal assembly according to claim 1, wherein the sealing surface includes a plurality of radially inwardly projecting lips, the lips being provided in a circumferentially closed manner.

8. The mechanical seal assembly according to claim 7, the lips being arranged exclusively at the sealing area.

9. The mechanical seal assembly according to claim 1, wherein an outer periphery of the sealing area is tapered in axial direction to a free end of the sealing region.

10. The mechanical seal assembly according to claim 1, wherein the seal region includes a lip-free projection starting from a first lip most proximal to a free end of the seal region.

11. The mechanical seal assembly according to claim 1, wherein the recesses are grooves extending in the axial direction.

12. The mechanical seal assembly according to claim 1, wherein a length of the recesses in the axial direction is greater than a length of the sealing area of the safety seal.

13. The mechanical seal assembly according to claim 1, comprising exactly one single mechanical seal.

14. A machine, especially a pump or compressor or expander, comprising a mechanical seal assembly according to claim 1.

* * * * *